United States Patent [19]

Prentice

[11] 3,750,243

[45] Aug. 7, 1973

[54] LOW LOSS ELECTRICAL CONDUCTIVE COATING AND BONDING MATERIALS INCLUDING MAGNETIC PARTICLES FOR MIXING

[75] Inventor: Winslow W. Prentice, Waterford, Conn.

[73] Assignee: The United States of America as represented by the Secretary of the Navy, Washington, D.C.

[22] Filed: Dec. 16, 1968

[21] Appl. No.: 783,976

[52] U.S. Cl. ............... 29/25.35, 117/227, 117/93.2, 259/1

[51] Int. Cl. ............... B01j 17/00

[58] Field of Search ............... 23/292; 29/25.35; 117/227, 238, 240, 93.2; 259/1, DIG. 46

[56] References Cited

UNITED STATES PATENTS

| | | | |
|---|---|---|---|
| 3,412,043 | 11/1968 | Gilliland | 117/227 |
| 2,280,135 | 4/1942 | Ward | 117/227 |
| 3,211,433 | 10/1965 | Chrostowski et al. | 259/108 |
| 2,774,803 | 12/1956 | Dreyfus | 259/1 |
| 3,175,991 | 3/1965 | Levine et al. | 117/227 |
| 3,175,091 | 3/1965 | Cheroff et al. | 117/227 |
| 3,278,455 | 10/1966 | Feather | 117/227 |

*Primary Examiner*—Carl D. Quarforth
*Assistant Examiner*—F. M. Gittes
*Attorney*—Louis A. Miller, Louis B. Applebaum and Arthur L. Bowers

[57] ABSTRACT

A conductive coating and bonding material for single element electrostrictive transducers and for those formed as a mosaic stack, or non-linear seriatim assembly of electrostrictive segments and including a matrix of known types of room temperature curing epoxy resin having uniformly dispersed therethrough, copper and silver flakes and nickel powder, the nickel powder being present for magnetic mixing. The term electrostrictive is used to the generic sense to encompass ceramic materials and piezoelectric natural or grown crystals.

1 Claim, 5 Drawing Figures

INVENTOR.
WINSLOW W. PRENTICE
BY Arthur L. Bowers
AGENT
Louis B. Applebaum
ATTORNEY

LOW LOSS ELECTRICAL CONDUCTIVE COATING AND BONDING MATERIALS INCLUDING MAGNETIC PARTICLES FOR MIXING

The invention described herein may be manufactured and used by or for the Government of the United States of America for governmental purposes without the payment of any royalties thereon or therefor.

This invention relates to providing a fluid material that has good bonding characteristics and cures and hardens at room temperature, and that has very good conductivity after being solidified and cured. It greatly extends the design horizons for larger, complex shaped high-power unit-bonded electrostrictive transducers. Also it can be used to form an electrostatic shielding coating on electric cables and electric components.

Conductive bonding agents known in the art and commercially marketed are inadequate as electrostrictive transducer segment bonding agents. The known conductive bonding agents are deficient in conductivity and do not bond vibratory transducer segments durably. To heighten comparatively poor conductivity, conductive bonding materials available commercially are overloaded with conductor particles resulting in a paste-like material that lacks sufficient strength and durability when hardened for a transducer assembly and that has inadequate conductivity. Heretofore, fabrication of transducers from a plurality of electrostrictive segments included the steps of coating surface areas of each segment with a conductive silver slurry, subjecting the coated segment to a proper firing-on temperature to harden and fix the conductive coating, soldering a conductor insert to the conductor coating then cementing the segment with a bonding material with provision for electrical connection between contiguous conductive surfaces and conductor insert, curing the bonding material and then soldering a conductor lead to a tab on the conductor insert. The process is multi-step, cumbersome and expensive.

A single-element electrostrictive transducer has surface areas coated with a conductor material and a conductor lead is cemented to each conductor coating. The characteristics of commercially marketed conductor bonding material mentioned previously are unsuitable for a single segment transducer. For such application too, the conductor bonding material is required to have good conductivity, good adhesion, and toughness, and is inexpensive to use.

An object of this invention is to improve conductive films and conductive bonds for transducers and other electrical elements.

Figure 1:
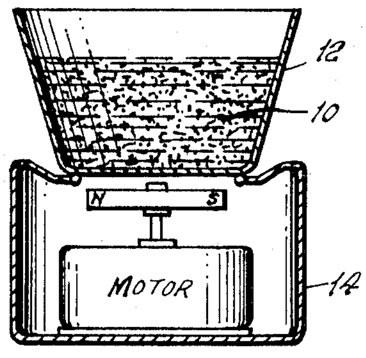
Figure 2:
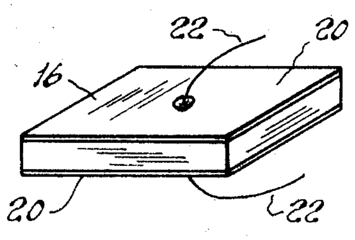
Figure 3:
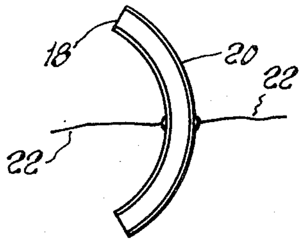
Figure 4:
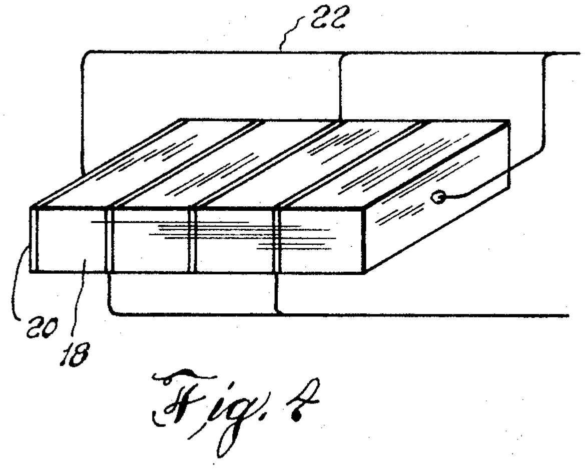
Figure 5:
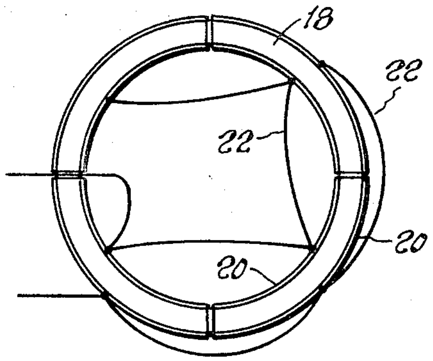

Other objects, advantages and novel features of the invention will become apparent from the following detailed description of the invention when considered in conjunction with the accompanying drawings wherein:

FIG. 1 shows a composition in accordance with this invention in a container on a magnetic mixer, FIG. 2 is a perspective view of a single segment flat transducer having opposed conductor coatings, FIG. 3 is an end view of a single segment arcuate transducer having opposed conductor coatings, FIG. 4 is a perspective view of a stacked multiple segment transducer, and FIG. 5 is a cylindrical transducer of arcuate segments having inner and outer conductive coatings.

I have discovered a composition that has superior conductivity and bonding characteristics for use on electrostrictive transducers. The composition is a mixture of silver flakes and copper flakes in a matrix of any one of various commercially marketed room temperature curing epoxy resins. In addition to the silver flakes and copper flakes the composition also includes nickel power which serves as an agent for stirring the mixture. In FIG. 1, the broadly described composition is in a non-magnetic container 12. The container 12 is seated on a magnetic mixer 14 for stirring the composition prior to application.

For superior conductivity, the composition must include silver and copper particles. For excellent conductivity, viz. approaching 1 ohm per square, the particles must be flakes. Elimination of copper flakes and substitution of an equal weight of silver flakes for the copper flakes in the composition results in substantially lower conductivity; similarly, elimination of silver flakes and substitution of an equal weight of copper flakes for the silver flakes results in substantially lower conductivity. Compositions having silver and copper particles in the form of flakes were compared against compositions having silver and copper particles obtained by grinding etc. and it was found that conductivity of the bonding material was superior where the conductor particles were in the form of flakes. Silver flakes and copper flakes in the ratio of approximately 8:1 in the described composition provides optimum conductivity. However whether or not in the form of flakes, and even in ratios substantially different from 8:1, conductivity of the bonding material containing silver and copper particles is superior to the conductivity of known conductive bonding materials.

Nickel powder is included in the composition to serve as a stirring agent only. It is not evident whether the presence of nickel powder in the composition affects the conductivity of the composition directly. The quantity of nickel powder and the size of the nickel particles is guided by the purpose of the nickel powder in the mixture, namely to serve as a stirring agent capable of eliminating voids, lessening viscosity of the matrix just prior to application by taking advantage of the thexotropic properties of epoxy resin and improving conductive contact among the conductive particles. The quantity of nickel powder is no greater than is necessary for the purpose of effective stirring under the influence of the magnetic mixer and particle size is preferably small for the purpose. The following example is preferred composition in accordance with the teachings of this invention.

Example 2 grams nickel powder of granule size on the order of 0.002 inch, 8 grams of silver flakes and 1 gram copper flakes on the order of 325 mesh are combined in a non-magnetic container. 5 grams isobutyl ketone is added the powder and the combination is stirred with a stirring stick. 2.5 grams of catalyzed epoxy resin is added and mixed manually. The non-magnetic container is placed on magnet mixer 14 for stirring the suspension. It is applied with a brush or other applicator to the surface to be coated.

The choice of organic solvent used in the mixture was not found to be significant provided it was compatible with the selected epoxy resin. The solvent serves to reduce the viscosity of the fluid mixture and to facilitate stirring of the components and application. The percentage of solvent in the mixture is based on the viscosity needed during application. For application to a coarse horizontal upwardly facing surface, the composition should have low viscosity while for application to a vertical smooth surface, the composition should have high viscosity else it will run down and thus not cure in place. The quantity of solvent also is based on a balance between facilitating mixing and increasing drying time. Where the composition is to be used for coating electric cables, or electric components, or partitions for electrostatic shielding, low viscosity is desirable to facilitate application.

The organic solvent serves a very important function other than reducing viscosity of the resin to a level best for mixing and for application. It greatly improves upon the void-free character of the composition and wetting of the particles by the resin for added strength. However, the solvent must be added to the mixture of particles and the particles briefly stirred in the presence of the solvent for thorough wetting before the resin is added to the particles. Adding the particles to the resin or adding the resin to the particles and then adding solvent does not result in as good a quality conductive bonding material.

In FIG. 2–5 there is shown various transducer applications for the composition in accordance with this invention.

Piezoelectric crystal element 16 and electrostrictive ceramic element 18 as shown in FIGS. 1 and 2 have surface areas coated with layers 20 of conductor. A conductor lead 22 is bonded in good electrical contact with each conductor layer for delivering driving energy to or for extracting detected signal energy from the element. Larger electrostrictive configurations as shown in FIGS. 4 and 5 are fabricated as an assembly of smaller electrostrictive elements in many designs bonded conductive face to conductive face to form a large composite electrostrictive transducer.

It has been difficult and expensive heretofore to form the conductive films, join a conductor lead to each film, and where required to bond together a plurality of electrostrictive elements conductive face to conductive face. This invention has simplified, improved and reduced the cost of carrying out this function as well as providing an advantageous technique for providing electrostatic shield coatings on partitions, cables, and components.

Obviously many modifications and variations of the present invention are possible in the light of the above teachings. It is therefore to be understood that within the scope of the appended claims the invention may be practiced otherwise than as specifically described.

I claim:

1. A method of forming a durable tenacious conductive layer of finely divided conductor particles in a matrix of room temperature curing epoxy resin on a surface of an electrostrictive element to which layer is bonded a conductor lead comprising combining 8 parts of silver conductor flakes and 1 part of copper conductor flakes with 2 parts of nickel powder, thoroughly wetting the conductor flakes and nickel powder with a solvent compatible with the epoxy resin, adding 2½ parts of uncured room-temperature curing epoxy resin to the wetted conductor flakes and nickel powder, subjecting the combination to a rotating magnetic field for stirring the combination, applying the resultant mixture as a layer on the surface of the electrostrictive element, wetting a conductor portion with the mixture and forcing the wetted portion of the conductor into the layer, and then permitting the resin to cure.

* * * * *